H. HAID.
POTATO PLANTER.
APPLICATION FILED OCT. 31, 1908.
918,536.
Patented Apr. 20, 1909.
2 SHEETS—SHEET 2.
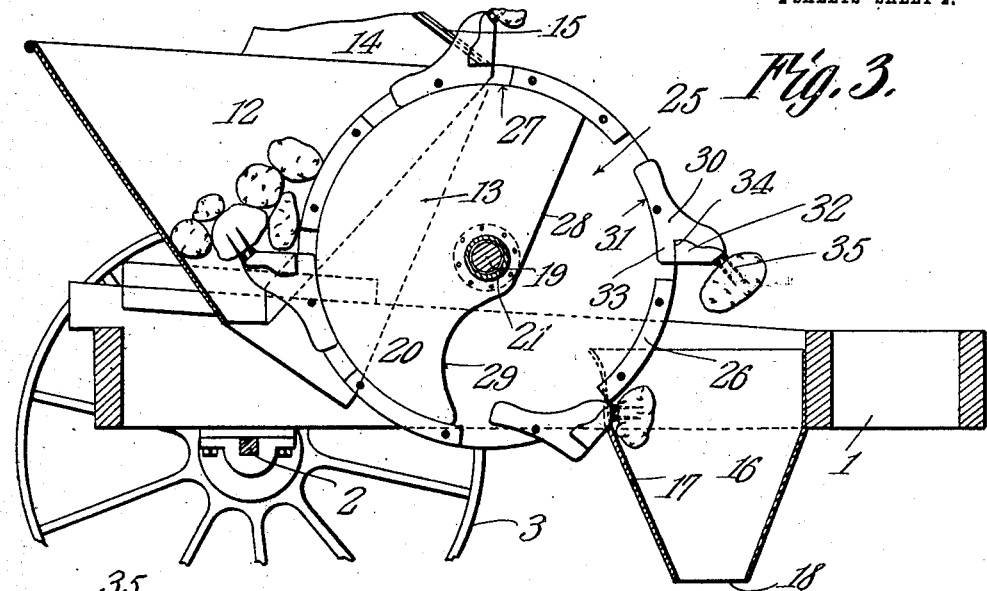
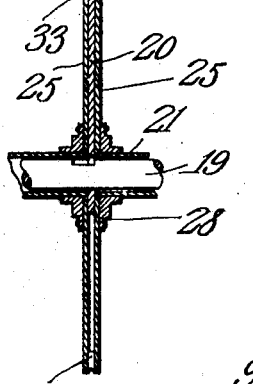
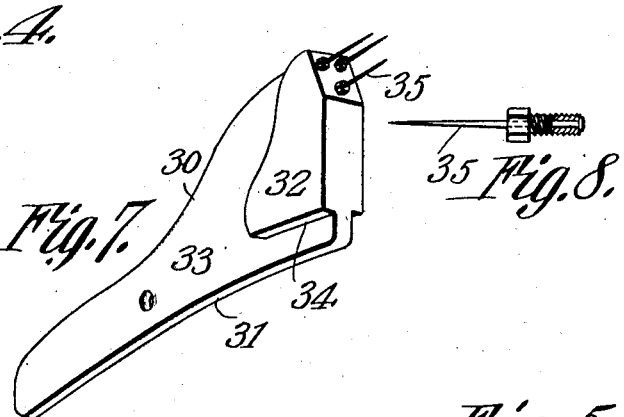
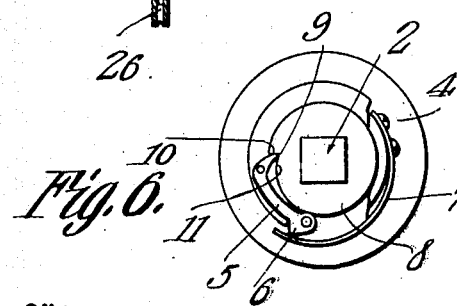
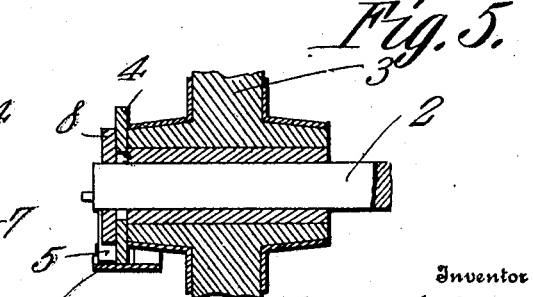
Inventor
Herbert Haid.
By C. A. Snow & Co.
Attorneys
Witnesses

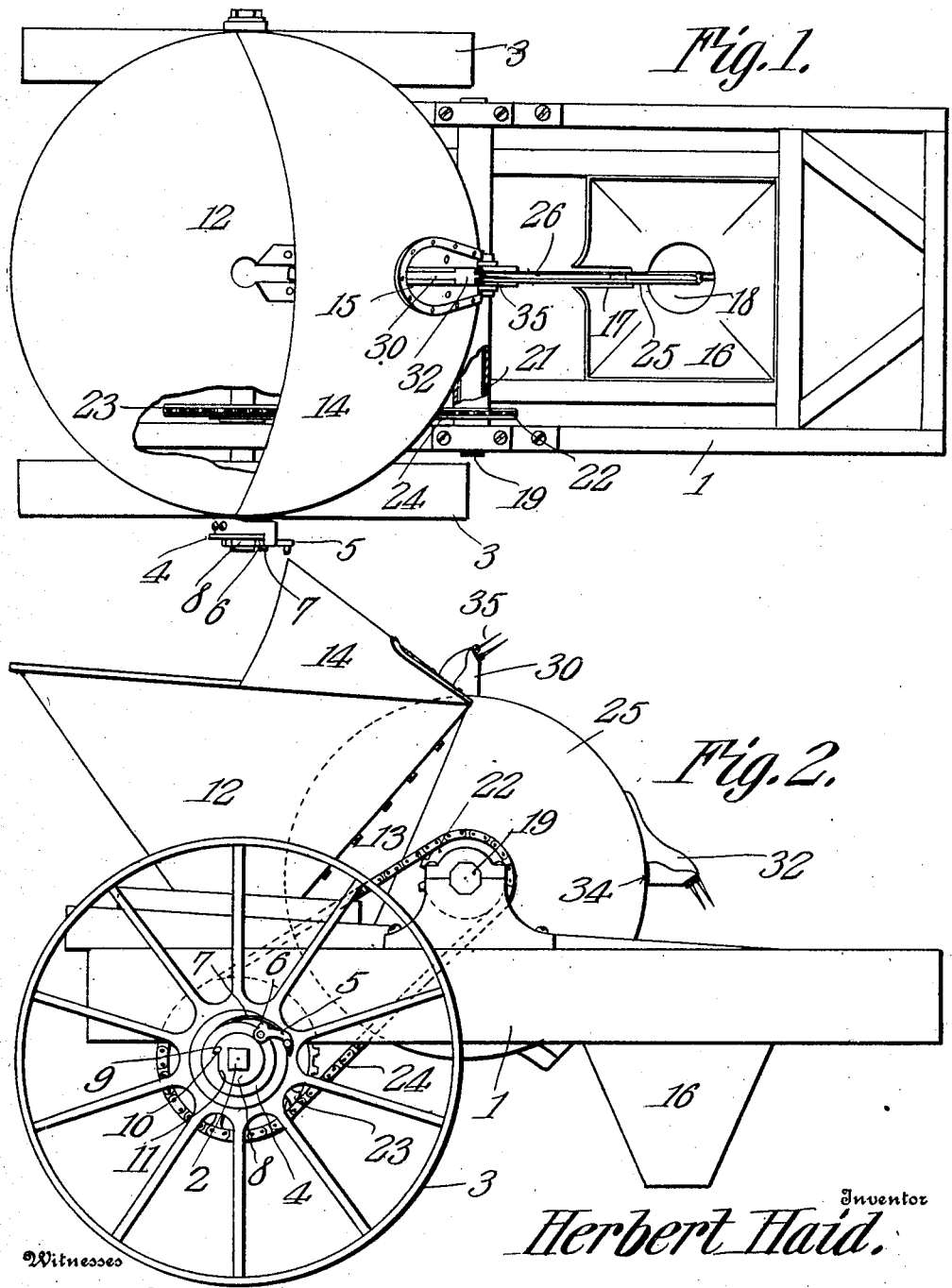

UNITED STATES PATENT OFFICE.

HERBERT HAID, OF SALEM, OREGON.

POTATO-PLANTER.

No. 918,536.   Specification of Letters Patent.   Patented April 20, 1909.

Application filed October 31, 1908. Serial No. 460,516.

*To all whom it may concern:*

Be it known that I, HERBERT HAID, a citizen of the United States, residing at Salem, in the county of Marion and State of Oregon, have invented a new and useful Potato-Planter, of which the following is a specification.

This invention has relation to potato droppers and consists in the novel construction and arrangement of its parts, hereinafter shown and described.

The object of the invention is to provide a dropper of the character indicated, which embodies a potato-containing hopper and a potato-receiving hopper, between which is located a rotating potato-selector and transmitter, which is adapted to operate upon the potatoes in the containing hopper and select the same singly and transmit the selected potatoes successively to the receiving hopper, where they are deposited in a similar manner, and from which they may fall to the ground.

The potato selector and transmitting member is of peculiar construction and is adapted to operate upon the potatoes in an effective manner and accomplish the transmission thereof from one hopper to the other without injury to the potatoes. The said member is provided at its peripheral portion with a series of pivoted arms, each of which carries a plurality of impaling pins. The said arms are held in fixed positions with relation to the body portion of the said member during the time that they are operating upon the potatoes in the containing hopper, and the pins thereof are impaling the potatoes, but the said arms are rendered free to swing with relation to the body portion of the member when they are about to deliver the potatoes to the receiving hopper. By reason of the fact that the potatoes are removed from the pins by coming in contact with the opposite side edges of a slot provided in the receiving hopper and through which slot said arms may pass, it will be observed that the potatoes will not be mutilated or torn by the pins as they are withdrawn from the same, for the reason that the arms may swing so that the pins may be removed from the potatoes in the direction of the longer dimensions of the pins. That is to say, the pins are withdrawn from the potatoes by an endwise movement, and not by a lateral movement, which latter movement would have a tendency to tear the potatoes, or otherwise mutilate the same.

A further object of the invention is to provide means for transmitting rotary movement from the supporting wheels of the implement to the rotary selector in such manner that the said selector will be operated in one direction only, and that a straightforward direction, notwithstanding the fact that the implement, as an entirety, should be moved in a backward direction. The same means for transmitting movement to the rotary selector is susceptible of manipulation whereby the said selector may be caused to remain at a state of rest while the implement is moving in a forward direction.

In the accompanying drawings:—Figure 1 is a top plan view of the dropper with parts broken away. Fig. 2 is a side elevation of the same. Fig. 3 is a sectional view of a portion of the dropper. Fig. 4 is a sectional view of the selector and transmitter used in the dropper. Fig. 5 is a sectional view of the hub of one of the supporting wheels of the dropper. Fig. 6 is a side elevation of a pawl and disk mechanism used upon the dropper. Fig. 7 is a perspective view of an arm used upon the dropper. Fig. 8 is a side view of a pin used upon said arm.

The implement consists of the frame 1, to which is journaled the axle 2. Ground wheels 3 are loosely journaled upon the opposite end portions of the axle 2. One of the wheels 3 is provided upon its hub with a concentrically arranged plate 4. The pawl 5 is pivoted upon the plate and is provided in the vicinity of its pivoted end with an approximately V-shaped lug 6. The spring 7 is fixed at one end to the hub of the wheel 3, which carries the plate 4 and is provided with a free end portion which engages the lug 6. The said spring 7 is under tension with a tendency to force its free end in close contact with the lug 6 of the pawl 5. By reason of the fact that the said lug 6 is substantially V-shaped, it is apparent that as the said lug is turned under the free end of the spring and is swung from one position to another, the pressure of the spring will be transferred from one of the sides of the lug 6 to the other side thereof, and, by such an arrangement, the pawl 5 may be held under spring tension in two positions, the object of which will be hereinafter explained. The disk 8 is fixed to the axle 2, and is located against the outer face of the plate 4. Said disk is provided in its periphery with a notch 9. The notch 9 is provided with a radially disposed wall or side 10, and a side 11, which is substantially tangentially disposed with relation to a circle struck from the center of the axle 2 as a center. The side 10 of the notch 9 is disposed in the same direction in which the wheel 3 rotates when the implement is moving in a forward direction, and the side 11 is disposed in the opposite direction. The free end of the pawl 5 is adapted to engage the periphery of the disk 8 when the said pawl is swung down in its lower position, and when the free end of the said pawl is against the periphery of the disk 8 and the wheel 3, upon which the said pawl is mounted, is turning in a forward direction, the said pawl will enter the slot 9 and engage the radially disposed side 10 thereof; thus the axle 2 will be caused to rotate with the wheel 3. If, however, the wheel 3 should turn in the rearward direction, the free end of the pawl 5 will move along the side 11 of the notch 9 and out of the said notch, and the axle 2 will remain at a state of rest. The object of this has been heretofore alluded to, but will be more fully explained hereinafter.

The conical containing hopper 12 is mounted upon the frame 1 and is provided at its forward side with a slot or opening which extends from its reduced end to its upper edge. The lip plates 13 are attached to the hopper 12 at the edges of the said slot and diverge slightly from each other toward the reduced end of the hopper 12. The hood or shield 14 is located upon the top forward portion of the hopper 12 and is provided with an enlarged opening 15, which is located over the upper end of the slot in the forward side of the said hopper 12. The hopper 12 is superposed upon the frame 1. The receiving hopper 16 depends from the frame 1 and is located in the vicinity of the forward end thereof. The hopper 16 is provided in its rear side with a slot 17, and is provided in its bottom with an outlet 18.

The shaft 19 is fixedly mounted on the frame 1 and is located between the hopper 12 and the hopper 16. A plate 20 (of peculiar configuration) is fixedly mounted upon the shaft 19 in the vicinity of the middle thereof. The sleeve members 21 are journaled for rotation upon the opposite end portions of the shaft 19, and one of the members 21 is provided with a sprocket wheel 22. A sprocket wheel 23 is mounted upon the axle 2 and occupies the same vertical plane as that in which the sprocket wheel 22 lies, and the sprocket chain 24 passes around the sprocket wheels 22 and 23. The disks 25 are fixed at their centers to the inner ends of the sleeve members 21 and are located one upon each side of the plate 20. The edges of the disks 25 extend beyond the edge of the plate 20, and the peripheral portions of the said disks 25 are spaced apart by the sectors 26, which, in turn, are spaced from each other. Thus open spaces are provided at the peripheries of the disks 25, between the ends of the adjacent sectors 26.

The plate 20 is provided with an arcuate edge 27 which is concentric with the center of the shaft 19 and which is disposed over the upper portion of the said shaft. The plate 20 is also provided with a transversely disposed straight edge 28, which, at one end, merges into the curved edge 29, which, in turn, joins with the lower end portion of the arcuate edge 27.

The arms 30 are pivotally mounted between the disks 25 and the ends of the adjacent sectors 26. Each arm 30 is provided with an arcuate under edge 31, which is adapted to slide along the arcuate edge 27 of the plate 20 as the said arms pass over the said plate, and each arm 30 is provided with a head portion 32 and with a shank portion 33. The head portion 32 of each arm is provided with the laterally disposed shoulders 34, which, at times, are adapted to engage the peripheries of the disks 25. The impaling pins 35 are mounted upon the head portion 32 of each arm 30. The impaling pins 35 are so positioned and disposed upon the arms 30 that when the arcuate edges of the arms are sliding along the arcuate edge 27 of the plate 20, the pointed ends of the said pins will extend in the direction in which the disks 25 are rotating.

The diameter of the disks 25 is such that the upper rear portions of the said disks project through the slot provided in the front side of the hopper 12, and the pins 35 carried by the arms 30 enter the said hopper 12 at the reduced end thereof, and, as the said arms 30 move forwardly and downwardly, they pass through the slot 17 provided in the receiving hopper 16.

It is obvious that rotary movement is transmitted to the sleeve members 21 and the disks 25 carried thereby through the sprocket wheels 22 and 23 and chain 24 from the axle 2 when the said axle is rotated. Thus, as the arms 30 and the pins 35 carried thereby successively enter the reduced end portion of the hopper 12, the said pins carried by the said arms impale a potato or a section thereof and carry the same up through the opening 15 in the hood 14 upon the hopper 12. During the movement of the arms 30 through the hopper 12 the arcuate edges 31 of the said arms slide along the arcuate edge 27 of the plate 20, and thus the said arms are held in relatively fixed positions with relation to the disks 25. When, however, the arms 30 descend and pass between the edges of the slot 17 in the receiving hopper 16, the extremities of the shanks 33 of the said arms pass beyond the lower end of the arcuate edge 27 of the plate 20, and the said arms 30 are then free to swing upon their pivotal connections with the disks 25. The slot 17 in the receiving hopper 16 is of sufficient width or area to permit the arms 30 to pass therethrough, but not sufficiently wide to permit of a potato or a potato section carried by an arm 30 and the pin 35 thereof to pass through. Consequently, as the said arm passes through the said slot the potato carried thereby is brought at its sides against the edges of the slot 17, and the movement of the potato or potato section with the disks 25 is checked, while the arm 30 continues to move with the disks. Inasmuch as the arm, at this particular point, is free to swing upon its pivot, it will turn with relation to the disks 25, so that the longer dimensions of the pins 35 will be substantially tangentially disposed with relation to the peripheries of the disks 25 and the pins 35 will pull longitudinally away from the potato or potato section. The said potato will then fall down through the hopper 16 and out through the outlet thereof to the ground.

The implement, as described, may be provided with a furrow-opening plow, and furrow-closer, if desired, or may be preceded by a separate implement adapted to open a furrow, and followed by another implement adapted to close the earth over the potatoes or potato sections, after they have been dropped into the furrow. Inasmuch as such furrow-openers and closers are common expedients, they are merely referred to herein. The lip plates 13, attached to the edges of the slot provided in the front of the hopper 12 serve as braces for the material of the hopper at the slotted portion thereof, and also serve as fenders to prevent the disks 25 from carrying dirt up into the hopper 12. They further serve as guides for directing the needles 35 through the slot of the hopper 12.

Thus it will be seen that an implement is provided upon which containing and receiving hoppers are mounted, with a selecting and conveying member located between them and arranged to operate so that the potatoes are conveyed from one hopper to the other with regularity and uniformity whereby the planting of the crop will be facilitated and accomplished in a desirable manner to permit of future cultivation and harvesting.

Having described my invention, what I claim as new, and desire to secure, by Letters Patent, is:—

1. In a dropper a containing and a receiving hopper, a selecting and transmitting member located between the said hoppers and mounted for rotation, an arm pivotally mounted upon the said member means for holding said arm in a relatively fixed position with relation to the member while passing through the containing hopper, said arm being free for pivotal movement while passing through the receiving hopper.

2. In a dropper a containing and a receiving hopper, a selecting and transmitting member located between the hoppers and journaled for rotation, a fixed plate located adjacent the said member, an arm pivoted to the member, impaling pins mounted upon the arm, the plate having an arcuate edge against which the edge of the arm is adapted to slide during a portion of its movement, whereby the arm is held in a relatively fixed position with relation to the member, said arm being free to swing upon its pivot when it passes beyond the arcuate edge of the said plate.

3. In a dropper as described, a selecting and transmitting member comprising a fixed shaft, a plate mounted upon the shaft and having an arcuate edge portion, a disk journaled upon the shaft, means for rotating the said disk, an arm pivotally attached to the disk and having an arcuate edge adapted to slide along the arcuate edge of the said plate, and impaling pins carried by the arm.

4. In a dropper as described, a selecting and transmitting member comprising a fixed shaft, a plate fixed to the shaft and having an arcuate edge, disks journaled for rotation upon the shaft, means for rotating the disks, an arm pivotally mounted between the disks and having an arcuate edge adapted to slide along the arcuate edge of the plate, said arm having a shouldered head for engagement with the edge of the disk and impaling pins carried by said head.

In testimony that I claim the foregoing as my own, I have hereto affixed my signature in the presence of two witnesses.

HERBERT HAID.

Witnesses:
A. O. CONDIT,
RUTH BOLLIER.